United States Patent
Crisfalusi et al.

(10) Patent No.: US 12,406,503 B2
(45) Date of Patent: Sep. 2, 2025

(54) METHOD AND APPARATUS FOR THE DETECTION OF BEHAVIOURS IN A RETAIL ENVIRONMENT

(71) Applicant: EVERSEEN LIMITED, Blackpool (IE)

(72) Inventors: Dan Alin Crisfalusi, Sacalaz jud. Timis (RO); Alan O'Herlihy, Cork (IE); Cristina Todoran, Judetul Arad (RO); Vasile Gui, Timisoara (RO); Dan Pescaru, Timisoara (RO); Ciprian Petru David, Timisoara (RO); Cosmin Cernazanu, Timisoara (RO); Arion Alexandru, Timisoara (RO)

(73) Assignee: EVERSEEN LIMITED, Blackpool (IE)

( * ) Notice: Subject to any disclaimer, the term of this patent is extended or adjusted under 35 U.S.C. 154(b) by 0 days.

(21) Appl. No.: 18/280,136

(22) PCT Filed: Mar. 3, 2022

(86) PCT No.: PCT/EP2022/055491
§ 371 (c)(1),
(2) Date: Sep. 1, 2023

(87) PCT Pub. No.: WO2022/184872
PCT Pub. Date: Sep. 9, 2022

(65) Prior Publication Data
US 2024/0144689 A1    May 2, 2024

(30) Foreign Application Priority Data

Mar. 4, 2021   (EP) .................................... 21160834

(51) Int. Cl.
*G06V 20/52*    (2022.01)
*G06T 7/20*    (2017.01)
(Continued)

(52) U.S. Cl.
CPC ............. *G06V 20/52* (2022.01); *G06T 7/20* (2013.01); *G06T 7/73* (2017.01); *G06V 10/25* (2022.01);
(Continued)

(58) Field of Classification Search
CPC ................................. G06V 20/52; G06T 7/73
See application file for complete search history.

(56) References Cited

U.S. PATENT DOCUMENTS

| | | | | |
|---|---|---|---|---|
| 5,013,896 A | * | 5/1991 | Ono | G07G 1/0036 235/377 |
| 6,437,819 B1 | * | 8/2002 | Loveland | H04N 7/181 348/E7.086 |

(Continued)

OTHER PUBLICATIONS

Patent Cooperation Treaty: International Search Report and Written Opinion for PCT/EP2022/055491; Kurzbauer, Werner; Jun. 15, 2022; 13 pages.

*Primary Examiner* — Irfan Habib

(57) ABSTRACT

A method and apparatus for the identification of suspect behaviour in a retail environment, the method comprising: detecting a person in a frame of said stream of video data; extracting a set of activities of the identified person from the stream of video data; assigning a numeric value to each extracted activity in the set of extracted activities, said numeric value representative of a threat level of the activity; accumulating said numeric values to provide a behaviour score; and identifying a behaviour as being suspect when the behaviour score reaches a target threshold value associated with the behaviour.

10 Claims, 4 Drawing Sheets

(51) Int. Cl.
*G06T 7/73* (2017.01)
*G06V 10/25* (2022.01)
*G06V 10/764* (2022.01)
*G06V 40/20* (2022.01)

(52) U.S. Cl.
CPC ............ *G06V 10/764* (2022.01); *G06V 40/20* (2022.01); *G06T 2207/30241* (2013.01); *G06V 2201/07* (2022.01)

(56) References Cited

U.S. PATENT DOCUMENTS

| | | | | |
|---|---|---|---|---|
| 6,725,206 | B1* | 4/2004 | Coveley | G01G 19/4144 |
| | | | | 705/16 |
| 7,200,266 | B2* | 4/2007 | Ozer | G06V 40/10 |
| | | | | 382/199 |
| 7,672,876 | B2* | 3/2010 | Bonner | G06Q 30/0601 |
| | | | | 705/26.1 |
| 7,844,509 | B2* | 11/2010 | Bodin | G06Q 10/087 |
| | | | | 340/572.1 |
| 7,848,964 | B2* | 12/2010 | Bonner | H04L 67/52 |
| | | | | 370/473 |
| 9,886,827 | B2* | 2/2018 | Schoner | G06V 20/52 |
| 9,972,187 | B1* | 5/2018 | Srinivasan | G08B 21/043 |
| 9,996,818 | B1* | 6/2018 | Ren | G06F 16/5866 |
| 10,055,853 | B1* | 8/2018 | Fisher | H04N 23/90 |
| 10,127,438 | B1* | 11/2018 | Fisher | G06V 10/82 |
| 10,133,933 | B1* | 11/2018 | Fisher | G06V 20/41 |
| 10,134,004 | B1* | 11/2018 | Liberato, Jr. | G06Q 10/087 |
| 10,140,820 | B1* | 11/2018 | Zalewski | H04W 4/80 |
| 10,157,452 | B1* | 12/2018 | Tighe | G06T 5/80 |
| 10,176,683 | B2* | 1/2019 | Meganathan | G06F 16/739 |
| 10,282,852 | B1* | 5/2019 | Buibas | G06T 7/246 |
| 10,291,862 | B1* | 5/2019 | Liberato | G06V 20/52 |
| 10,296,814 | B1* | 5/2019 | Kumar | G06V 10/764 |
| 10,321,275 | B1* | 6/2019 | Orlov | H04W 4/025 |
| 10,387,896 | B1* | 8/2019 | Hershey | H04N 23/90 |
| 10,438,277 | B1* | 10/2019 | Jiang | G06Q 30/0635 |
| 10,442,852 | B2* | 10/2019 | Kruzel | C07K 16/00 |
| 10,459,103 | B1* | 10/2019 | Shi | G01V 3/08 |
| 10,466,095 | B1* | 11/2019 | O'Neill | G01G 19/42 |
| 10,474,991 | B2* | 11/2019 | Fisher | G06N 3/04 |
| 10,474,992 | B2* | 11/2019 | Fisher | G06V 20/52 |
| 10,475,185 | B1* | 11/2019 | Raghavan | G06Q 10/087 |
| 10,650,265 | B1* | 5/2020 | Price | G06V 20/20 |
| 11,238,290 | B2* | 2/2022 | Burns | H04N 7/185 |
| 11,699,439 | B2* | 7/2023 | George-Svahn | G06V 40/174 |
| | | | | 704/246 |
| 11,974,077 | B2* | 4/2024 | Mirza | G06V 10/82 |
| 12,155,665 | B2* | 11/2024 | Ainsworth | G08B 13/00 |
| 2006/0279630 | A1* | 12/2006 | Aggarwal | G08B 13/19645 |
| | | | | 348/42 |
| 2007/0011099 | A1* | 1/2007 | Sheehan | G06Q 20/322 |
| | | | | 705/65 |
| 2007/0069014 | A1* | 3/2007 | Heckel | G06Q 30/02 |
| | | | | 235/383 |
| 2007/0282665 | A1* | 12/2007 | Buehler | G08B 13/19697 |
| | | | | 705/7.29 |
| 2009/0049001 | A1* | 2/2009 | Nickerson | G06N 5/02 |
| | | | | 706/52 |
| 2009/0089107 | A1* | 4/2009 | Angell | G06Q 10/00 |
| | | | | 705/318 |
| 2009/0276705 | A1* | 11/2009 | Ozdemir | G06V 40/20 |
| | | | | 715/708 |
| 2010/0138281 | A1* | 6/2010 | Zhang | G06Q 10/087 |
| | | | | 705/28 |
| 2010/0318440 | A1* | 12/2010 | Coveley | G07G 1/0036 |
| | | | | 705/26.1 |
| 2013/0117053 | A2* | 5/2013 | Campbell | G06Q 10/087 |
| | | | | 705/7.11 |
| 2013/0284806 | A1* | 10/2013 | Margalit | G07G 1/0009 |
| | | | | 235/382 |
| 2014/0016845 | A1* | 1/2014 | Gazit | G06T 7/38 |
| | | | | 382/130 |
| 2014/0132728 | A1* | 5/2014 | Verano | G06V 20/52 |
| | | | | 348/46 |
| 2014/0333775 | A1* | 11/2014 | Naikal | H04N 21/44008 |
| | | | | 348/159 |
| 2016/0092739 | A1* | 3/2016 | Oami | G06V 20/52 |
| | | | | 348/159 |
| 2017/0323376 | A1* | 11/2017 | Glaser | G06Q 30/0643 |
| 2018/0048894 | A1* | 2/2018 | Chen | G06T 7/11 |
| 2018/0115749 | A1 | 4/2018 | Toshiyuki et al. | |
| 2018/0300557 | A1* | 10/2018 | Rodenas | G08B 13/19613 |
| 2018/0357247 | A1* | 12/2018 | Siminoff | G08B 13/19606 |
| 2019/0197369 | A1* | 6/2019 | Law | G06N 3/082 |
| 2019/0205643 | A1* | 7/2019 | Liu | G06N 3/045 |
| 2019/0244500 | A1* | 8/2019 | Fisher | G08B 13/19682 |
| 2019/0311346 | A1* | 10/2019 | Costello | G08B 13/19697 |
| 2019/0347611 | A1* | 11/2019 | Fisher | G06T 7/246 |
| 2020/0057885 | A1* | 2/2020 | Rao | G06V 40/172 |
| 2020/0302230 | A1* | 9/2020 | Chang | G06F 18/214 |
| 2020/0327315 | A1 | 10/2020 | Mullins | |
| 2020/0334481 | A1* | 10/2020 | Makita | G06V 20/52 |
| 2020/0349820 | A1* | 11/2020 | Speagle | G08B 13/19658 |
| 2021/0042509 | A1* | 2/2021 | Valiulla | G06N 20/00 |
| 2023/0156038 | A1* | 5/2023 | Konda | H04L 9/0643 |
| | | | | 713/151 |
| 2023/0179955 | A1* | 6/2023 | Williams | A61B 5/4833 |
| | | | | 455/456.1 |
| 2023/0386217 | A1* | 11/2023 | Brakob | G06Q 20/206 |

* cited by examiner

METHOD AND APPARATUS FOR THE DETECTION OF BEHAVIOURS IN A RETAIL ENVIRONMENT

CROSS-REFERENCE TO RELATED APPLICATIONS

This application is a U.S. National Phase application submitted under 35 U.S.C. § 371 of Patent Cooperation Treaty application serial no. PCT/EP2022/055491, filed Mar. 3, 2022, and entitled METHOD AND APPARATUS FOR THE DETECTION OF BEHAVIOURS IN A RETAIL ENVIRONMENT, published as WO 2022/184872 A1. Patent Cooperation Treaty application serial no. PCT/EP2022/055491 claims priority to European Patent Application No. 21160834.4, filed Mar. 4, 2021. All of the aforesaid are incorporated by reference herein in their entirety.

FIELD OF THE INVENTION

The present invention relates to systems and methods for the detection of behaviours in a retail environment and in particular behaviours relating to shoplifting activities in a retail environment.

BACKGROUND TO THE INVENTION

In present day retail environments, there is a significant cost overhead associated with monitoring and surveillance in a retail store. This overhead is incurred in the employment of security staff monitoring certain areas of the store, in the cost of technology associated with detection of shop-lifting, and indeed stock losses due to inabilities to provide full store monitoring or through deceptive or distracting behaviours or shoplifters working in groups.

Retail crime (i.e. crime against shops) is the largest single category of crime in the United Kingdom, judged by the number of offences and the value stolen [Clarke R. V., Shoplifting Problem-oriented Guides for Police, Problem-Specific Guides Series, Number 11, US department of Justice, Office of Community Oriented Policing Services, Washington DC, 2003]. The US National Association of Shoplifting Prevention (NASP) estimates that more than $13 billion worth of goods are stolen from retailers each year (or approximately $35 million per day). The dominant form of retail shrinkage and crime in the UK in 2019 is shoplifting and organised retail crime committed by gangs [Retail Crime Costs in the UK 2019, Centre for Retail Research 2019.].

Goods are easily concealed for example in rucksacks, bags, pushchairs and the like. Clothes can be tried on in changing rooms and neither paid for nor returned. Goods can be stolen and later returned for a full refund, or a 'shopper' can simply empty a shelf and walk out of the store with the products. Shoplifters range from amateurs acting on impulse, to career criminals who habitually engage in shop-lifting as a form of income. Indeed, Organised Retail Crime (ORC) consists of gangs or groups of criminals stealing merchandise, data, or cash from retailers. It can involve large-scale organised shoplifting and refund fraud using a network of small-time thieves.

Retailers only catch or detect a proportion of their offenders and offences. There are two main reasons for this, namely: retailers do not know how many offenders went undetected and the values stolen; and they do not know the relationship between detected offenders and the number of undetected thieves. To address this problem, UK retailers spent £977 m in 2010 on loss prevention. In the corresponding period $12.1 billion was spent by US retailers [J. Bamfield, Shopping and Crime, Springer, 13 Mar. 2012]. Loss prevention mechanisms include a variety of security features and methods, including cables and hanger locks that require the assistance of a salesperson, plain-clothes detectives to observe customers as they shop on the floor, video surveillance cameras, and electronic article surveillance (EAS) devices attached to their products that cause alarms to go off if a thief walks out of the store before they are deactivated.

However, for budgetary or other reasons, EAS devices may not be attached to every product in a store. Furthermore, even when attached to a product, an EAS device can be removed therefrom by a determined shoplifter. Similarly, cables and hanger locks that require the assistance of a salesperson can deter potential shoppers from making a purchase. Video footage from video surveillance cameras typically requires monitoring and review by security personnel, a task which becomes increasingly difficult and expensive in larger retail stores. Indeed, loss prevention employees account for a little more than 50% of total loss prevention spending on a worldwide basis.

The present application aims to automate the process of detecting behaviours which may be characterised as shop lifting behaviours. This is achieved using non-intrusive, automated behavioural modelling to detect and identify occurrences of a range of behaviours. Following their identification, these behaviours can then be addressed. This allows for the reduction of costs and loss prevention through effective deployment and focussing of security resources on relevant individuals. The detection of these behaviours allow focussed loss prevention, act as a deterrent to potential shop-lifters, allow for intervention in shop-lifting incidents or the collation of evidence for use in criminal proceedings against a shoplifter. The system and methods of the application facilitate the detection, isolation and mapping of a sequence of performed actions which may be indicative of a shoplifting related behaviour.

SUMMARY OF THE INVENTION

As described herein with reference to the appended claims there is provided a method and apparatus for the identification of suspect behaviour in a retail environment. In accordance with a first embodiment, there is provided a method for the identification of suspect behaviour in a retail environment, comprising: detecting a person in a frame of a stream of video data obtained from a plurality of video sensors in the retail environment; extracting a set of activities of the detected person from the stream of video data; assigning a numeric value to each extracted activity in the set of extracted activities, said numeric value representative of a threat level of the activity; accumulating the said numeric values to provide a behaviour score; and identifying a behaviour as being suspect when the behaviour score reaches a target threshold value associated with the behaviour.

Detecting the person may comprise classifying the detected person as a tracked person or a non-tracked person. The set of behaviours may be extracted only for the tracked person. The method may further comprise tracking the path of the detected person about the retail environment.

Detecting the person in the frame of a stream of video data may further comprise establishing localization information for the detected person; and predictively classifying the identified person as the tracked person or non-tracked person.

Establishing localization information may comprise establishing a bounding box framing the detected person. Tracking the path of the detected person may comprise encoding the appearance of the person based on a plurality of semantic features, selected from a list including visual appearance, body movement and interaction with the surroundings in the retail environment. In a further configuration the encoded appearance of the person may be stored in a repository. It will be appreciated that the methods outlined above may further comprise assigning a unique identifier to the detected person. Path data outlining the tracking of the detected person about the retail environment may also be stored.

Extracting the set of activities may also comprise estimating a set of poses of the detected person. Estimating the set of poses may comprise identifying a predefined set of points on the detected person and detecting successive movements of each of the predefined set of points over a time interval. Extracting the set of activities may further comprise determining a vector representative of the trajectory of the detected person about the retail environment.

It will be appreciated that assigning the numeric value may comprise assigning a value of 1 to each extracted activity and weighting the value based on a likelihood that the activity is associated with a behaviour to provide the numeric value.

Accumulating said numeric value may comprise setting the behaviour score to zero when a person is detected and wherein accumulating said numeric values comprises adding the numeric value to the suspect behaviour score. In an additional step an alert may be generated when the when the accumulated behaviour score reaches the target threshold associated with the behaviour.

It will be appreciated that the present application also encompasses setting a plurality of target threshold value, each target threshold value associated with a different alert from a set of predefined alerts.

The stream of video data may be obtained by a plurality of video sensors positioned to monitor selected zones of the retail environment.

There is also provided a computer program comprising program instructions for causing a computer program to carry out the above method which may be embodied on a record medium, carrier signal or read-only memory.

In a further configuration of the present application, there is provided an apparatus for the identification of suspect client behaviour in a retail environment, comprising: means for detecting a person in a frame of a stream of video data obtained from a plurality of video sensors in the retail environment; means for extracting a set of activities of the detected person from the stream of video data; means for assigning a numeric value to each extracted activity in the set of extracted activities, said numeric value representative of a threat level of the activity; means for accumulating said numeric values to provide a behaviour score; and means for identifying a behaviour as being suspect when the behaviour score reaches a target threshold value associated with the behaviour.

There is also provided a means for implementing the above method which may be embodied by a processor or a plurality of processors.

A further embodiment of the present invention provides an apparatus for the detection of suspicious client behaviours in a retail environment, comprising: a plurality of video sensors for generating a stream of video data from a plurality of video sensors; a client tracking unit configured to detect a person in a frame of the stream of video and detect a person in a frame of said stream of video data; a behaviour feature detection unit configured to extract a set of activities of the detected person from the stream of video data; a suspect activity detection unit configured to assign a numeric value to each extracted activity in the set of extracted activities, said numeric value representative of a threat level of the activity; a score update unit configured to accumulate said numeric values to provide a behaviour score; and a message issuing unit configured to identify a behaviour as suspicious when the behaviour score reaches a target threshold value associated with the behaviour.

Each unit outlined above may be implemented using one or more processing modules.

The client tracking unit may comprise a human classification module configured to detect the person in the frame of said stream of video data and assign a unique identifier and a behaviour score to the identified person. The client tracking unit may further comprise a human tracking module configured to track the detected person through the retail environment and provide a path identifier for identifying the tracked path.

The behaviour detection unit may comprise a trajectory computation module configured to output a predicted trajectory for the detected person, an object detection module configured to detect objects picked up by the detected person and a human pose estimation module configured to extract the set of activities of the detected person.

The suspect activity detection unit may comprise a plurality of modules configured for the detection of disparate suspect activities, each module arranged to detect a predefined suspect activity. Each module may have a weighting factor associated therewith. The suspect activity detection unit may be configured to sum the output of each module to define the behaviour score. The messaging unit is configured to issue an alert when the behaviour score reaches the target threshold level.

It should be appreciated that all combinations of the foregoing concepts and additional concepts discussed in greater detail below are contemplated as being part of the inventive subject matter disclosed herein.

BRIEF DESCRIPTION OF THE DRAWINGS

Embodiments of the invention will be described, by way of example only, with reference to the accompanying drawings in which.

DETAILED DESCRIPTION OF THE DRAWINGS

As described herein with reference to the appended claims and drawings, the present invention considers the detection of customer behaviours in a retail environment. The present application considers the inferred behaviour of a person in a retail environment.

The present application considers recognized human action components to characterise the behaviour of a person in a retail environment, combining human classification, human tracking, human vector estimation and trajectory computation. This provides a framework for blending qualitative-oriented knowledge from the field of psychology and crime prevention with optimized, quantitative, risk evaluation.

When considering shop-lifting as the detected behaviour, the present application enhances and improves the efficiencies associated with the activity of loss prevention officers in a retail environment.

Retail environments, such as shops or shopping centres, are often monitored using a plurality of video sensors. The plurality of video sensors, 102, are positioned throughout the retail environment. These video sensors are often positioned to monitor selected zones. These monitored zones may be zones susceptible to particular behaviours. Such a behaviour may include shop lifting, and these sensors are positioned to monitor selected zones where there is an increased risk of shoplifting. For example, video sensors may be positioned to monitor zones including shelves or tables with products which are targeted by shoplifters. Video streams are collected by the video sensors, 102.

As described herein, video streams are processed in accordance with the systems and methods described herein to create an identifier for a person or people entering the store. This identifier is used to subsequently track movements and detect the occurrence of activities suggestive of a behaviour, for example shoplifting intent.

In accordance with the methods and systems described below, penalty points or numeric values are assigned to each suspect activity. The magnitude of the penalty point or numeric value is representative of a threat level of the activity. A threat level is representative of the likelihood that an activity is suspicious. This threat level is reflective of the severity of a detected suspect activity. The identifier is created for a person on their entry into the retail environment, for example in a first frame of video. Each person may also be assigned an initial behaviour score. This initial behaviour score or "Suspect Behaviour Score" can be initialised to zero on entry of the person or persons into the retail environment or store. If an identified person is detected undertaking a suspect activity a numeric value or penalty point is added to their behaviour score. When a person's behaviour score meets or exceeds a threshold, an alarm or notification can be triggered as an alert to a detected behaviour. This allows appropriate response measures to be undertaken.

Figure 1:
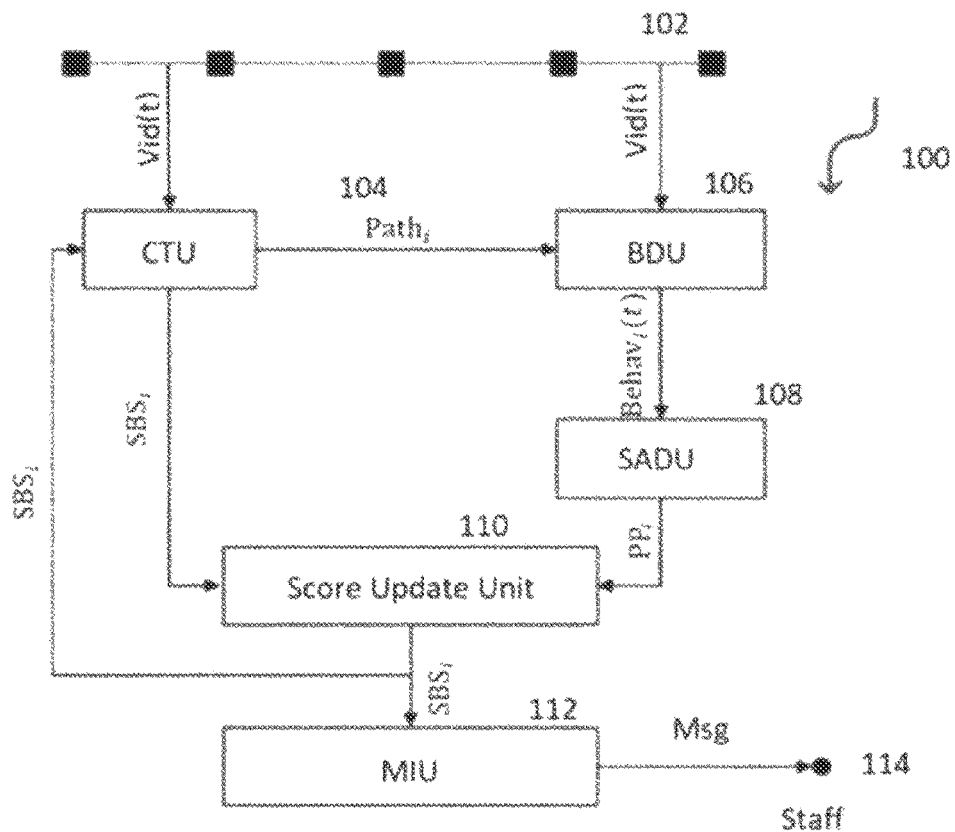
FIG. 1 depicts an apparatus for the detection of behaviours in accordance with the present invention.

In accordance with FIG. 1, there is described a behaviour detection system 100 in accordance with an embodiment of the present invention.

A plurality of surveillance sensors 102 are provided. These surveillance sensors may be a plurality of video sensors. These sensors are adapted to collect video footage from the retail environment or store. This footage comprises a frame or plurality of frames of video collated from one or a plurality of video sensors. These sensors transmit the frames of video to a central server for processing. The link(s) to the central server may be wired or wireless or a combination of both. The central server may comprise a single server unit or a plurality of other processing units either co-located at the retail site or at a remote or plurality of remote locations.

The video footage is processed by a Client Tracking Unit or Module (CTU), 104. The (CTU) 104 receives the video footage or stream of video data from the plurality of video sensors. One or more people are detected in the video footage. One or more identifiers are created and assigned to the detected people within the video frames. Each person identified may be assigned a unique identifier.

The CTU 104 is also adapted to track the detected people through the retail environment.

A Behaviour Feature Detection Unit (BDU) 106 is configured to receive the video frames from the sensor and identifiers assigned by the CTU 104. The BDU extracts, from the video frames, a set of behavioural features expressed by the, or each of the detected people. It will be appreciated that in a first step, the expression by a person of one or more different types of behavioural features are detected. These are observed over a period of time. These detected features are assessed to detect patterns associated with a particular activity being undertaken by the detected person and as further outlined below.

The outputs from the CTU and the BDU are passed to a Suspect Activity Detection Unit (SADU) 108. The SADU (108) is configured to detect an activity from the set of behavioural features and assign a numeric value, or penalty point value to the identifier of the detected person who expressed the behavioural features.

As a person moves through the retail environment they may be tracked by the Client Tracking Unit (CTU) 104 and penalty points may be accumulated. The numeric values of the penalty points are accumulated to provide a behaviour score. For example, a person on entering the retail environment has a behaviour score of zero. As the person moves through the retail environment, they may incur one or more penalty points depending on their behaviour, wherein the incurred penalty points are added or accumulated to the person's behaviour score, thereby causing their behaviour score to increase.

The accumulation is carried out in a Score Update Unit 110 based on the existing behaviour score and the newly assigned penalty points.

A Message Issuing Unit (MIU) 112 compares the behaviour score to a threshold. This threshold may be predefined. When the behaviour score exceeds or meets a threshold, the Message Issuing Unit 112 is adapted to issue Notification, Alarm or Severe Alarm messages in response. While described herein as modules, it will be appreciated that the functionality may be implemented on a single processor or multiple processors.

The Client Tracking Unit (CTU) 104 is implemented as a module on the central server or remote from the central server and in communication therewith. The Client Tracking Unit (CTU) 104 detects or identifies a person in a video frame. The detected person is classified. For example the person may be classified as a tracking client, as a person of interest, a child or a member of staff. The Client Tracking Unit (CTU) 104 further establishes one or more identifiers for one or more of the detected persons. This identifier is used to track the detected person(s) as they move through the store.

Figure 2:
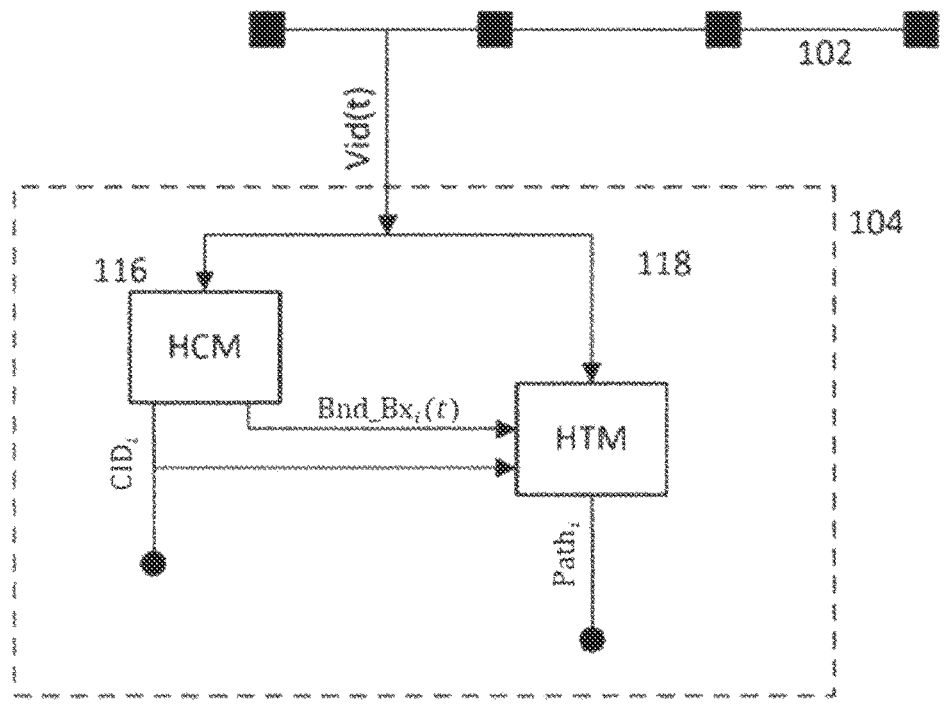
FIG. 2 is an embodiment of a Client Tracking Unit (CTU) of FIG. 1.

As described in relation to FIG. 2, in an embodiment of the Client Tracking Unit (CTU) 104, there is included a Human Classification Module (HCM) 116 and a Human Tracking Module (HTM) 118.

The Human Classification Module (HCM) 116 implements a machine learning algorithm referred to herein as the HCM algorithm. The HCM algorithm is adapted to detect one or more people appearing in a frame of the stream of video data; and to establish localization information for the detected person(s) by establishing a bounding box around the or each person in the frame. This frame may for example be the first frame wherein a person is detected. This first frame may have been captured as a person enters the store.

The HCM algorithm is further adapted to predict a classification label for the detected person(s). Specifically, the HCM algorithm is adapted to classify a detected person as being either a person of interest, or a person of lesser interest, for example a child or a store worker. The classification of a detected person prevents the issuance of false alarms by the system. The actions of children or staff members can be selectively excluded from consideration by the behaviour detection system.

More specifically, actions of children under a certain age can be excluded, or selected staff members can be excluded so that their actions are not tracked by the system. For clarity, persons tracked by the system are referred to herein as Tracked Persons and excludes persons are referred to as Non-tracked Persons. The Human Classification Module (HCM) 116 is configured to enable discrimination to be made between Tracked Persons and Non-tracked Persons.

The Human Classification Module (HCM) 116 is adapted to create a Client Tracking Instance (CTI) for each detected Tracked Person on their entry into the retail environment or store. The Client Tracking Instance comprises:

(i) a unique Client Identifier ($CID_i$ where i=1 to Nc; and Nc is the number of persons in the store) which links the Client Tracking Instance to the Tracked Person; and (ii) a numerically valued behaviour score or Suspect Behaviour Score (SBS), wherein in a preferred embodiment the SBS value is initialized to a value of 0. The behaviour score can however be initialised to any value.

Figure 3:
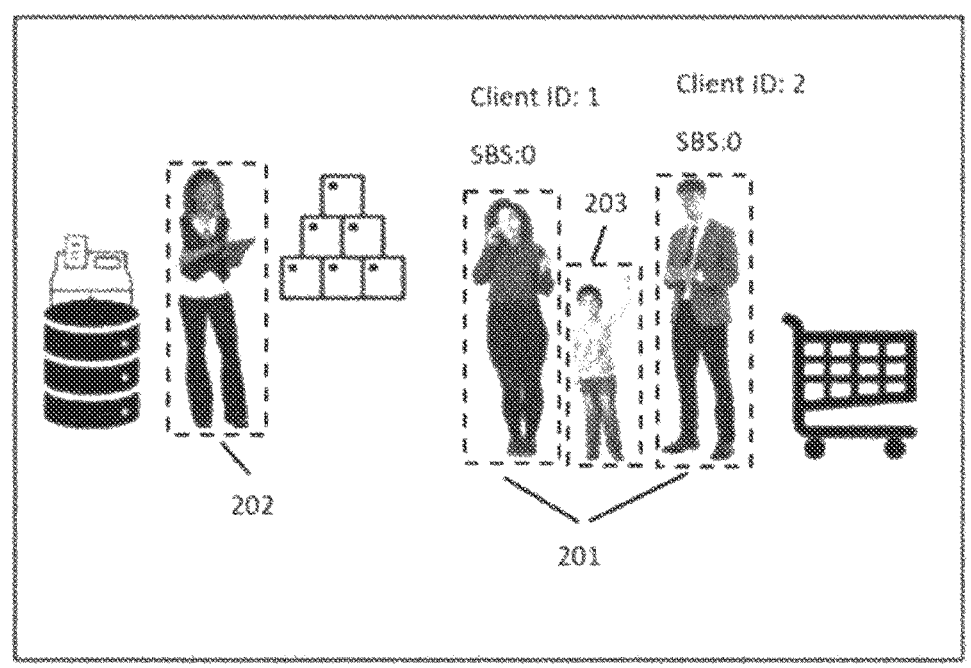
FIG. 3 shows the implementation of bounding boxes in accordance with an embodiment of the present invention.

Considering the embodiment of FIG. 3, a video frame is analysed. A person or persons in the video frame are detected and denoted by bounding boxes. These bounding boxes facilitate the tracking of the person(s). FIG. 3 depicts a staff member 202, a child 203 and other potential people to be tracked 201. Each of these identified persons are enclosed in a bounding box. The Human Classification Module (HCM) 116 is configured to distinguish between each of these detected persons. Objects such as a cash till, shopping trolley, stacked goods, shelving also appearing in the frame are not enclosed in bounding boxes; and are ignored by the Human Classification Module (HCM) 116.

The Client Tracking Unit (CTU) 104 is further configured to track each Tracked Person as they move through the store ($Locn_i(t)$).

Training data for the HCM algorithm may be obtained by a human operator tagging video-frames previously extracted from the video stream. The training data may be organised in in a pairwise fashion, wherein each data pair comprises a video frame and a corresponding XML file. The XML file contains information describing the bounding boxes. For example, this includes coordinates defining the bounding box defined relative to the video frame and also incorporating the corresponding classification label (Tracked Person/Non-Tracked Person (child, staff member etc.) for each bounding box. These bounding boxes establish localization information for the detected person. The output of the HCM algorithm for each video frame is a set of bounding boxes (each bounding box being defined by coordinates. These coordinates may for example be coordinates of opposite corners of the bounding box), $Bnd\_Bx_i(t)$. In addition the HCM algorithm outputs a set of Client identifiers, ($CID_i$).

In a preferred embodiment the HCM algorithm is trained with video frames labelled with customer/staff/child information.

In addition to the Human Classification Module (HCM) 116, the Client Tracking Unit (CTU) 104 also incorporates the Human Tracking Module (HTM) 118. The Human Tracking Module (HTM) 118 provides a means for tracking the detected person's movements about the retail environment. The video stream is provided to the Human Tracking Module (HTM) 118 with the output of the Human Classification Module (HCM) 116. The Human Tracking Module (HTM) 118 uses this information to track the detected persons as they move through the retail environment and provide an output comprising a path which that person takes through the store. The Human Tracking Module (HTM) 118 is configured to identify the video frames in which a given Tracked Person appears using a person re-identification process. The Human Tracking Module (HTM) 118 encodes the appearance of a person based on a plurality of semantic features selected from the list including visual appearance, body movement and interaction with the surroundings in the retail environment.

It is assumed that the physical appearance of the Tracked Person does not significantly change between query image and the search images. It will be appreciated that physical appearance is key information that can be used to achieve higher re-identification performances. A gallery is provided consisting of a number of images of known individuals, the goal of closed-world person re-identification being to return a ranked list of individuals from the gallery for each image or group of images of an unknown person. Thus, the Human Tracking Module (HTM) 118 encodes a Tracked Person's appearance through a variety of rich semantic features about visual appearance, body movement and interaction with the surroundings. This approach is premised on the observation that humans rely on similar visual cues to identify other people. These semantic features essentially form a biometric signature of the Tracked Person which is used to re-identify the Tracked Person in the video stream as they move about in different parts of the store.

Using the gallery, the Human Tracking Module (HTM) 118 builds an internal repository of the semantic features of Tracked Persons on their entry to the store. This internal repository is referred to herein as the Gallery Feature Set. The Gallery Feature Set is populated with feature representations of each Tracked Person extracted (from the gallery) and stored in the Gallery Feature Set. Storing the feature representations may be implemented through the use of a trained person re-identification network for example that described in M. Ye, J Shen, G Lin, T Xiang, L Shao and S. C. H. Hoi, "Deep Learning for Person Re-identification: A Survey and Outlook" arXiv 2001.04193. Since the specific identities of these Tracked Persons is largely unknown, the semantic features of each Tracked Person are associated with the Tracked Persons through their Client Identifier (CID). In other words, during the tracking process, the Human Tracking Module (HTM) 118 links the biometric signature for a Tracked Person with the Client Identifier ($CID_i$) of that person received from the Human Classification Module (HCM) 116. In one embodiment both the Client Tracking Instance ($CTI_i$) corresponding to the Client Identifier ($CID_i$), and the corresponding biometric information the feature gallery set will be deleted when the Tracked Person leaves the store.

Presented with a further image of a Tracked Person (i.e. a Query Image of a Query Person) in the retail environment, the person re-identification algorithm is configured to determine the relevant semantic features of the Tracked Person (using the trained person re-identification network to extract the feature representation of the Query Person from the Query Image). The extracted feature representation is compared with those in the Gallery Feature Set. If a match is found, the Tracked Person is identified as the Tracked Person with the Client Identifier ($CID_i$) corresponding with the matching feature representation in the Gallery Feature Store. Using this information, the Human Tracking Module (HTM) 118 retrieves images of that Tracked Person from the collection of images captured by the surveillance sensors 102 located throughout the store. It will be appreciated that a focus of this activity is retrieving images captured within a short time interval of the Query Image.

If the feature representation of the Query Person from the Query Image does not match any in the Gallery Feature Set, the Query Person is identified as a new person who was not detected on their entry to the store by the Human Classification Module (HCM) 116. It will be appreciated that in such an instance the Human Classification Module (HCM) 116 may be called. If the person is classified by the Human Classification Module (HCM) 116 as being a Tracked Person, a new unique Client Identifier (CID) is allocated to the person by the Human Classification Module (HCM) 116, and the corresponding feature representation of the person is added by the Human Tracking Module (HTM) 118 to the Gallery Feature Set and associated with the Client Identifier.

In order to improve the accuracy of identifying relevant Tracked Person(s) in one embodiment, the Human Tracking Module (HTM) 118 employs a coarse-to-fine pyramid model, such as that described in Zheng, F., Deng, C., Sun, X., Jiang, X., Guo, X., Yu, Z., Huang, F. and Ji, R., 2019. Pyramidal person re-identification via multi-loss dynamic training. In Proceedings of the IEEE Conference on Computer Vision and Pattern Recognition (pp. 8514-8522). Such a model improves the robustness of the person re-identification algorithm by reducing its dependency on precise bounding box co-ordinates. In particular, the model not only incorporates local and global information, but also integrates the gradual cues between them.

In an alternative method the feature representations may be implemented through the use of a trained person re-identification network such as that described in BN-Inception (Ioffe, S. and Szagedy, C., Batch Normalization: Accelerating deep network training by reducing internal covariate shift, International Conference on Machine Learning 2015: 448-456). In use, the algorithm is trained using a dataset containing
  (i) video frames in which people appear; and
  (ii) annotated bounding boxes around the or each person in the video frames.

The annotation of each bounding box will include the Client Identifier (CID) of the enclosed person. This enables, the same person to be identified across multiple video frames collected from a set of video camera. Therefore, a set of bounding boxes annotated with the same Client Identifier (CID) will encapsulate appearance information of the same person extracted from different views thereof. Thus, the training data comprises a set of video frames; wherein each frame is represented by a CSV (comma separated variable) file, containing the frame number, the Client Identifier of the person appearing in the frame and the bounding box for that person. Because several people could appear in a single video frame, the CSV for any such video frame will comprise multiple entries, one for each person appearing in the video frame. During training, the classifier predicts the Client Identifier (CID) associated with a person for each bounding box detected.

The output from the Human Tracking Module (HTM) 118 is a set of data outlining the path taken by an identified person or Tracked $Person_i$ through the store. More specifically, the output from the Human Tracking Module (HTM) 118 is a $Path_i$ data set for the Tracked $Person_i$. The $Path_i$ data set details the times and locations in the store at which the Tracked $Person_i$ was detected by the surveillance sensors 102. The locations are established from the co-ordinates of corners of bounding boxes in the video frames in which the Tracked $Person_i$ appears and the identity of the surveillance sensor(s) that captured each such video frame.

Figure 4:
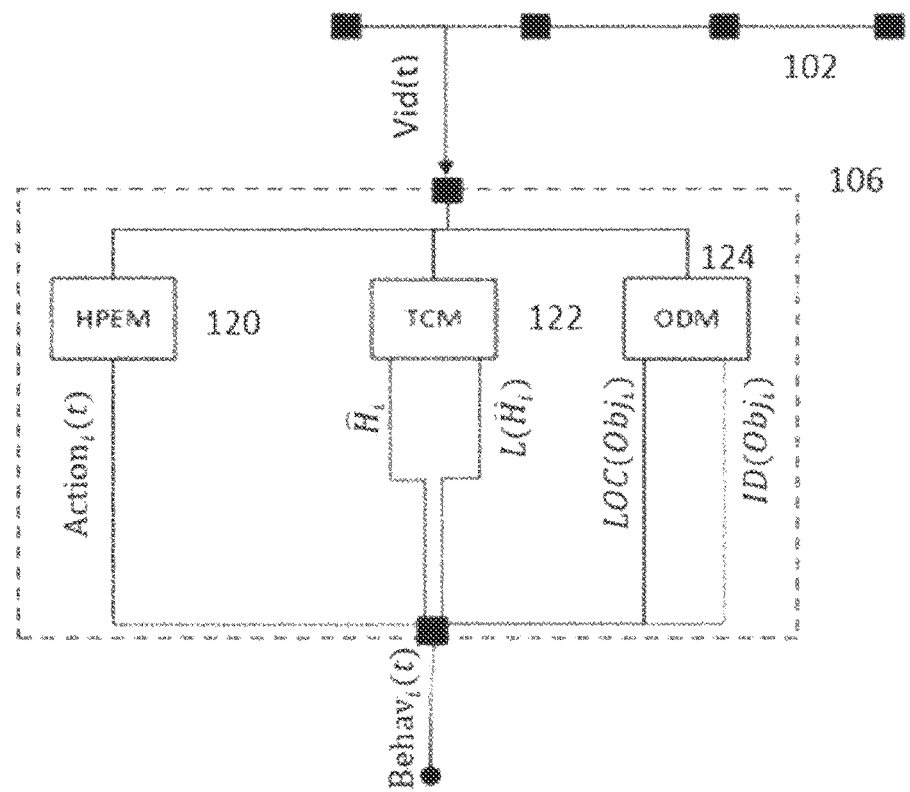
FIG. 4 is an embodiment of the Behaviour Detection Unit of FIG. 1.

In addition to the Client Tracking Unit (CTU) 104, a Behaviour Detection Unit (BDU) 106 is also implemented as a module on a processing system. This processing module may be located on the central server or remote from the central server and in communication therewith. The behaviour detection unit is adapted to receive the video stream or footage from the video sensors 102 and extract a set of activities of the identified person from the stream of video data. The Behaviour Detection Unit (BDU) 106 is configured to detect the demonstration of these certain behavioural features or activities (($Behav_i(t)$) of a detected person. The detection of the demonstration of the behavioural features may be restricted to Tracked Persons or persons of interest. This further refines the processing and eliminates members of staff or children from the tracking process. These activities are used to determine and identify a suspect activity. The Behaviour Detection Unit (BDU) 106 as shown in FIG. 4 comprises three modules, a Trajectory Computation Module (TCM) 122 adapted to output a predicted trajectory for each Tracked Person; an Object Detection Module (ODM) 124 configured to detect objects picked up by Tracked Persons in the store and assign a unique Object ID to each object; and a Human Pose Estimation Module 120 for the detection of the set of activities or behaviours of the identified Tracked Persons. It will be appreciated that while described as modules, these may be implemented on a single processor or controller or multiple processors or controllers.

Considering first the functionality of the Human Pose Estimation Module (HPEM) 120. The Human Pose Estimation Module (HPEM) 120 is configured to use the video stream from the video sensor and also the $Path_i$ data set, detailing the times and locations in the store at which the Tracked $Person_i$ was detected by the surveillance sensors 102. As outlined above, the locations may be established from the coordinates of opposing corners of bounding boxes in the video frames in which the Tracked $Person_i$ appears. Additionally, identity information of the video camera which obtained the relevant video frame may be provided. Activities or human actions are extracted by the Human Pose Estimation Module (HPEM) 120. This set of human actions can be a generic set of human actions or can be specifically refined to characterise a particular behaviour, for example shop lifting. For example, the human actions extracted are those most likely to be associated with shoplifting behaviours and include squatting, bending, and repetitive shoulder/head movements. These actions are recognised through human pose estimation of each Tracked $Person_i$ tracked by the Human Tracking Module (HTM) 118.

A human pose is formed by sixteen important points of the human skeleton, namely, right/left ankle, right/left knee, right/left hip, pelvis, thorax, upper neck, head top, right/left wrist, right/left shoulder, right/left elbow. In accordance with the present application, the Human Pose Estimation Module (HPEM) 120 detects movements of individual body parts and combines detected successive movements over a time interval to classify the action performed by the Tracked Person$_i$. For example, to detect a squatting action, a Tracked Person's head and shoulder joints may be monitored for the presence of at least three repetitive movements in the vertical axis performed within a 3-minute time interval.

Based on the received bounding box corner-coordinates, the Human Pose Estimation Module (HPEM) 120 in one configuration may use top-down methods to locate each person in a video frame. The Human Pose Estimation Module (HPEM) 120 can then apply pose estimation to determine the pose of that person. One suitable mechanism for pose determination is to use the UniPose neural network architecture such as that disclosed in Artacho, B. and Savakis, A., 2020. UniPose: Unified Human Pose Estimation in Single Images and Videos. arXiv preprint arXiv: 2001.08095. This neural network uses historical information to enable a temporal component to be considered in estimating joint movement. This network also takes into account blurring and occlusions.

Training the network may be implemented in one configuration as outlined in Mykhaylo Andriluka, Leonid Pishchulin, Peter Gehler, and Bernt Schiele. 2d human pose estimation: New benchmark and state of the art analysis. In IEEE Conference on Computer Vision and Pattern Recognition (CVPR), June 2014.

The human pose estimated by this network is then post-processed using a time-based sliding window of an interval $t_p$ (e.g. $t_p$=5 s) to extract the action Action$_i$(t) corresponding to the person's body movements in the interval [t, t+$t_p$]. The movements are defined by the trajectory (over each $t_p$ interval) of the body joint positions identified by the network. One or more actions (e.g. picking, dropping, bending, squatting, or throwing) corresponding with the detected body joint trajectories is determined in accordance with pre-defined detection strategies (i.e. which link known body part movements to specific known activities).

The output of Human Pose Estimation Module (HPEM) 120 is a series of labels, Action$_i$(t), each of which identifies one of several potential actions that could have been performed by the Tracked Person$_i$ at time t. In this way, the series of labels identifies the actions performed by the Tracked Person$_i$ at different points of time during their stay in the store.

Considering first the functionality of the Trajectory Computation Module (TCM) 122, this module is adapted to receive:
(i) video footage (Vid(t)) from the surveillance sensors 102, wherein the video-footage comprises all video frames in which a Tracked Person appears; and
(ii) Path$_i$ data set from the HTM 118. The Path$_i$ details the times and locations in the store at which the Tracked Person$_i$ was detected by the surveillance sensors 102. As outlined above these locations are established from the co-ordinates of corners of bounding boxes in the video frames in which the Tracked Person$_i$ appears and the identity of the surveillance sensor(s) that captured each such video frame.

The Path$_i$ data set collectively provides the spatial coordinates of all Tracked Persons in the store at each moment over a predefined time interval $T_{obs}$ (e.g. $T_{obs}$=40 s). In this way, at any time t, the presence and location of Tracked Person$_i$ in a scene can be represented by his/her head-top coordinates ($x_i^t$, $y_i^t$). Thus, the trajectory of a Tracked Person$_i$ is represented by a vector $H_i=\{(x_i^t, y_i^t)|t\in[1 \ldots T_{obs}]\}$.

The Trajectory Computation Module (TCM) 122 considers the positions of all the Tracked Persons in a scene over the time interval $[1 \ldots T_{obs}]$ and predicts their positions over the time interval $[T_{obs+1} \ldots T_{pred}]$. It will be appreciated that the input to the sequence corresponds to the observed positions of a Tracked Person in a scene. The output is a sequence predicting the Tracked Person's future positions at different moments in time. This allows the Trajectory Computation Module (TCM) 122 to compute over a predefined time interval, $T_{conf}$ (e.g. 3 minutes) the trajectory of a tracked customer. The Trajectory Computation Module (TCM) 122 in addition to predicting a trajectory, is further configured to classify the predicted trajectory as suspect or normal. The output of the Trajectory Computation Module (TCM) 122 therefore comprises a predicted trajectory $\hat{H}_i=\{(\hat{x}_i^t, \hat{y}_i^t)|t\in[T_{obs+1} \ldots T_{pred}]\}$ for each Tracked Person$_i$ together with the suspect/normal label of this trajectory $((L(\hat{H}_i))$.

It will be appreciated that there are many socially plausible ways that people could move, in the store in the future. To model these socially plausible motion paths, the Trajectory Computation Module (TCM) 122 in one arrangement may use a Social GAN architecture such as that disclosed in Gupta, A., Johnson, J., Fei-Fei, L., Savarese, S., & Alahi, A. (2018). Social GAN: Socially acceptable trajectories with generative adversarial networks. In Proceedings of the IEEE Conference on Computer Vision and Pattern Recognition (pp. 2255-2264). This Social GAN architecture observes motion histories and predicts future behaviour. In addition, this Social GAN algorithm is modified to include a trajectory classification (normal/suspect) as output. By training adversarially against a recurrent discriminator, this model can predict socially plausible future movements. However, in the present embodiment, the Social GAN algorithm is modified to include a trajectory classification (normal/suspect) as output. To train this ML algorithm the system counts on some pre-existing manually labelled data on trajectories classified as normal or suspect.

The Object Detection Module (ODM) 124 is arranged to identify the objects picked by identified person in the store. Once these objects are identified, the Object Detection Module (ODM) 124 is configured to assign a unique object ID to each such object. As shown in FIG. 4, the input to the Object Detection Module (ODM) 124 is a video frame. This is a video frame of a set of video frames of video footage wherein the video footage comprises all video frames in which a Tracked Person appears. The output of the Object Detection Module (ODM) 124 comprises the location (Loc (Obj$_i$)) of an object (Obj$_i$) in the video frame as denoted by a bounding box around the object; and the corresponding Object ID (ID(Obj$_i$)) for the object. If no object is detected, the Object Detection Module (ODM) 124 will output a NULL status value. It will be appreciated that this denotes that the Tracked Person has empty hands in the selected video frame.

Using this location and object ID for all objects enables the Object Detection Module (ODM) 124 to track an object over the time interval from when ($t_{pick}$) a Tracked Person picks up the object until the Tracked Person drops the object ($t_{drop}$) (e.g. when the Tracked Person moves the object to another shelf, or returns the object to its original shelf, or the Tracked Person places the object into a shopping trolley, shopping basket or bag etc.) and thereby determine (Loc (Obj$_i$(t)|t∈[t$_{pick}$ . . . t$_{drop}$])).

The action labels Action$_i$(t) from the Human Pose Estimation Module (HPEM) 120, the predicted Tracked Person trajectory $\hat{H}_i$ and the suspect/normal label of this trajectory (L($\hat{H}_i$)) from the Trajectory Computation Module (TCM) 122; and the location (Loc(Obj$_j$)) and ID (ID(Obj$_j$)) of detected objects from the Object Detection Module (ODM) 124, collectively form the behavioural features (Behav$_i$(t)) detected by the Behaviour Feature Detection Unit (BDU) 106.

In addition to the Client Tracking Unit (CTU) 104 and the Behaviour Feature Detection Unit (BDU) 106, a module for the detection of suspicious activity is also provided. As shown in FIG. 1, the output of the Behaviour Feature Detection Unit (BDU) 106 is provided to this module referred to herein as the Suspect Activity Detection Unit (SADU) 108. The Suspect Activity Detection Unit (SADU) 108 is implemented as a module on the central server or remote from the central server and in communication therewith. This module receives the detected behavioural features or activities ((Behav$_i$(t)) of the identified person or the Tracked Person (Tracked Person$_i$). These behavioural features are used to detect suspect activities. As outlined above and described in further detail below, a numeric value is assigned to each extracted activity in the set of extracted activities, said numeric value representative of a threat level of the activity. These numeric values may be referred to as Penalty Points (PP$_i$) and are associated with the detected activities (SA$_i$(t)) undertaken by the Tracked Person (Tracked Person$_i$). The sum of the penalty points for each Tracked Person is calculated and provided to an accumulation unit wherein the numeric values or penalty points are accumulated.

It will be appreciated that there is a large variety of gestures/actions that shoplifters often perform in succession. Therefore, several parallel detection strategies are implemented to detect and identify shoplifting intent from the received behavioural features.

While described herein as comprising fourteen separate modules for the detection of suspect activity, it will be appreciated that any number of modules can be implemented. A subset of the fourteen separate modules may be used or additionally modules over and above the fourteen separate modules can also be considered. The fourteen modules described are configured to analyse a Tracked Person's behavioural features (Behav$_i$(t)) and detect a specific but different type of behaviour. As described herein this behaviour may be associated with shoplifting. These separate strategies or modules can be applied during a portion or the entirety of a stay in the retail environment. For example, certain strategies can be applied at specific locations in the retail environment, for example near the exits, with different or overlapping strategies applied at or near a shelf.

Each module is referred to herein as a Suspect Activity Module (SAM).

Figure 5:
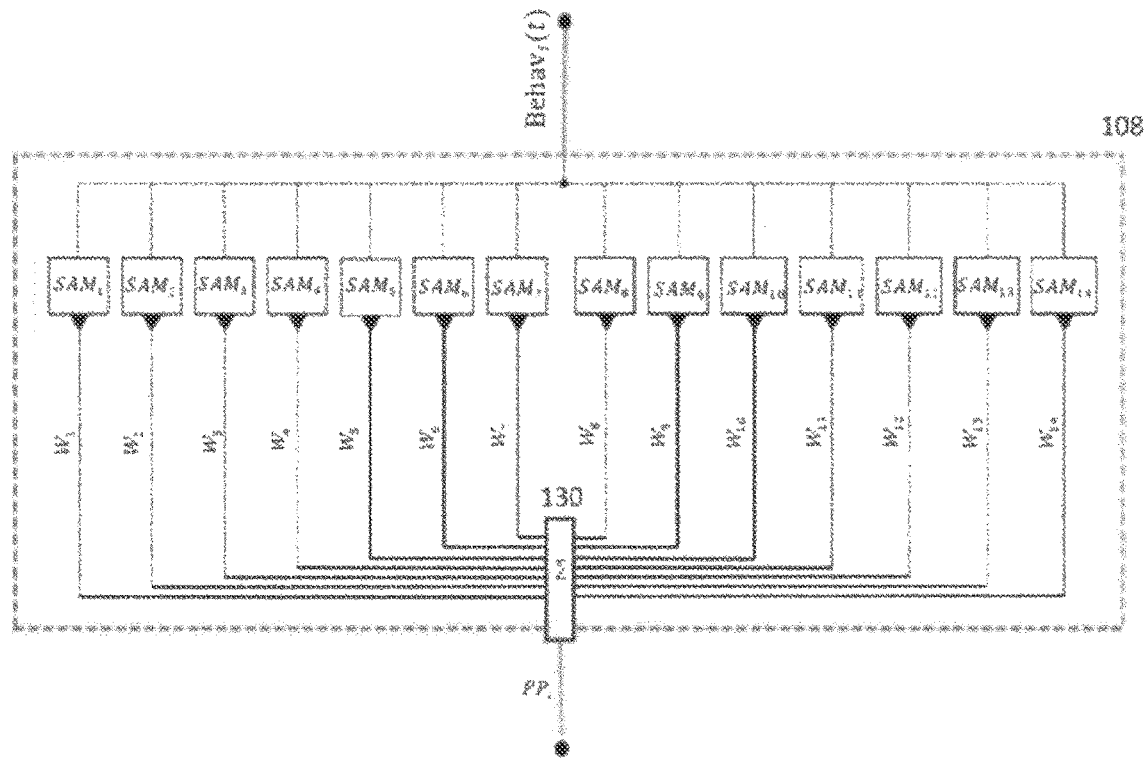
FIG. 5 is an embodiment of the Suspect Activity Detection Unit of FIG. 1.

Sample fourteen modules are shown in FIG. 5. These modules are outlined in the table below.

| SAM # | Detected Behaviour | Weighting Factor |
|---|---|---|
| 1 | Tracked Person Taking Considerably Different Paths Through the Store Than Tracked Person Usually Do | 1 |
| 2 | Unusual Tracked Person Movement Through the Store | 1 |
| 3 | Tracked Person Over-Patrolling a Given Area in the Store | 2 |
| 4 | Excessive Shoulder(s) Orientation Changes and Head-Swinging Actions | 2 |
| 5 | Repeated Squatting and/or Bending Actions Performed from Standing | 3 |
| 6 | Patrolling Between Shelves Behaviour Plus Bending and/or Squatting | 3 |
| 7 | Repeated Rapid Movements with Different Products Having Security Tag Attached | 2 |
| 8 | Detection of Un-Inspected Object Displacement | 3 |
| 9 | Detection of Repeated Simultaneous Multiple Product Displacements | 3 |
| 10 | Detection of Tracked Persons Holding a Product While Looking Elsewhere | 2 |
| 11 | Detection of Products Being Thrown from One Shelf to Another or Over Security Barriers | 4 |
| 12 | Detection of Tracked Persons Lifting Products Over their Head at Store Exit Security Barriers | 4 |
| 13 | Detection of Tracked Person Patrolling Between First Shelf and Second Shelf After Examining Product stored on First Shelf | 3 |
| 14 | Detecting Repetitive Tracked Person Movement with a Product Using the Same Body Part | 3 |

In addition, as shown in the table weighting factors, $W_1$ to $W_{14}$ are preassigned to each Suspect Activity Module (SAM). These are further indicated in the above table. The weighting factors possesses a value which corresponds with the risk that a Tracked Person demonstrating a given behaviour is engaging in shoplifting. It will be appreciated that the higher a weighting factor value, the higher the likelihood that a Tracked Person is engaged in shop-lifting. These values can be adapted or tuned depending on the requirements of the retail environment and to meet or address needs of the retailer.

Each Suspect Activity Module (SAM) is preferably initialised to a neutral state. However, when a Suspect Activity Module (SAM) detects a relevant type of behaviour, the Suspect Activity Module (SAM) is switched to an activated state in which it produces an output signal of value 1.

Each Suspect Activity Module (SAM) is coupled to a summing unit 130 by each Weighting Factor W1 to W14. In use, the output from each Suspect Activity Module (SAM) is multiplied by its weighting factor and communicated to the summing unit 130. The resulting output from the summing unit 130 is the value of the Penalty Points ($PP_i$) or behaviour score incurred by the Tracked Person$_i$ during their stay in the store.

The Penalty Points ($PP_i$) are transmitted to a Score Update Unit 110. Each Suspect Activity Module (SAM) is re-initialised to a neutral state (value of 0). The $PP_i$ may be transmitted on receipt from the Behaviour Feature Detection Unit (BDU) 106 of a new behavioural feature demonstrated by the Tracked Person.

Further details of each Suspect Activity Module (SAM) and the methods implemented therein are outlined below.

$SAM_1$: Tracked Person Taking Considerably Different Paths Through the Store Than Tracked Persons Usually Do As outlined, $SAM_1$ considers a Tracked Person taking considerably different paths through the store than would be a normal path for a shopper to take. $SAM_1$ would be switched to an activated state if the suspect/normal label of the Tracked Person's trajectory ($(L(\hat{H}_i))$) has a value of "suspect".

$SAM_2$: Unusual Tracked Person Movement Through the Store

Unusual Tracked Person movement is determined based on measuring the time it takes for a Tracked Person to follow a given path through the store, compared with the average time spent by most people following the same path. It will be appreciated that this identifies Tracked Persons who spend significantly greater or lesser times following the path than the average. To this end, an average travel time ($\overline{T_{\alpha,\beta}}$) taken by Tracked Persons to travel between one or more pre-defined path start and finish locations in the store (denoted by $A_\alpha$ and $A_\beta$ respectively) is computed dynamically, taking into account, all previous trajectories of all previous Tracked Persons in the store who took paths between $A_\alpha$ and $A_\beta$ The trajectory of Tracked Person$_i$ between the same pre-defined path start and finish locations is contained in the Tracked Person's predicted trajectory $\hat{H}_i$ from the Trajectory Computation Module (TCM) 122. The time $T_{\alpha,\beta}^{Tracked\_Person_i}$ taken by the Tracked Person$_i$ to follow this trajectory between $A_\alpha$ and $A_\beta$ is compared with the average travel time ($\overline{T_{\alpha,\beta}}$). If $T_{\alpha,\beta}^{Tracked\_Person_i} - \overline{T_{\alpha,\beta}} > 0.1\overline{T_{\alpha,\beta}}$ then this Suspect Activity Module (SAM) is switched to an activated state.

It should be noted that the/or each of the pre-defined path start and finish locations in the store should be manually configured by the store's management team, based on their knowledge of the store layout.

$SAM_3$: Tracked Person Over-Patrolling a Given Area in the Store

Determining over-patrolling is based on the predicted trajectory data $H_i$ received from the Trajectory Computation Module (TCM) 122. A calculation is made of the number of times ($Loop_{\alpha,\beta}^i$) Tracked Person$_i$ performs a loop between a first pre-defined location $A_\alpha$ and a second pre-defined location $A_\beta$ in the store. Similarly, by examining all the previous Tracked Persons' trajectories (also received from the Trajectory Computation Module (TCM) 122 that included the locations $A_\alpha$ and $A_\beta$, it is possible to calculate the number of loops performed by a Tracked Person between these locations in any given Tracked Person trajectory. From this, it is possible to establish a histogram of the frequency of individual numbers of loops performed between $A_\alpha$ and $A_\beta$ by all the previous Tracked Persons in the store. This histogram will be referred to henceforth as the $A_\alpha$ and $A_\beta$ loop histogram. To ensure its currency, the $A_\alpha$ and $A_\beta$ loop histogram is updated for each Tracked Person entering the store. The computed variable $Loop_{\alpha,\beta}^i$ is then compared with the $A_\alpha$ and $A_\beta$ loop histogram. If $Loop_{\alpha,\beta}^i$ exceeds a certain percentile (e.g. 80%) of the $A_\alpha$ and $A_\beta$ loop histogram, it suggests that Tracked Person$_i$ may be over-patrolling the region between $A_\alpha$ and $A_\beta$.

To increase the likelihood of an accurate inference of nefarious behaviour additional parameters may also be considered. For example, patrolling speed may be considered. It will be appreciated that in reacting and adjusting their behaviour in response to people nearby, shoplifters may vary the speed at which they perform those loops comparatively more than the rest of the Tracked Persons.

Using the above-mentioned predicted trajectory data $\hat{H}_i$ received from the Trajectory Computation Module (TCM) 122, a calculation is made of the speed at which a Tracked Person$_i$ performs each repetition of the loop between $A_\alpha$ and $A_\beta$. From this, the variation of the speed ($v_{\alpha,\beta}^i$) with which Tracked Person$_i$ performed the loop between $A_\alpha$ and $A_\beta$ can be calculated. Similarly, by examining all the previous Tracked Persons' trajectories (also received from the Trajectory Computation Module (TCM) 122) that included the locations $A_\alpha$ and $A_\beta$, it is possible to calculate the speed at which each Tracked Person performed each repetition of the loop between $A_\alpha$ and $A_\beta$. From this, it is possible to calculate the variation in the speed at which each Tracked Person performed the loop between $A_\alpha$ and $A_\beta$; and establish a histogram of the variation in the speeds within the population of Tracked Persons in the store. For brevity, this histogram will be referred to henceforth as the $A_\alpha$ and $A_\beta$ speed variance histogram. To ensure its currency, the $A_\alpha$ and $A_\beta$ speed variance histogram is updated with each Tracked Person entering the store. The computed variable ($v_{\alpha,\beta}^i$) is then compared with the $A_\alpha$ and $A_\beta$ speed variance histogram. If $v_{\alpha,\beta}^i$ exceeds a certain percentile (e.g. 80%) of the $A_\alpha$ and $A_\beta$ speed variance histogram, it suggests that Tracked Person$_i$ is engaging in suspect patrolling behaviour. In other words, if $Loop_{\alpha,\beta}^i$ exceeds a certain percentile (e.g. 80%) of $A_\alpha$ and $A_\beta$ loop histogram; and $v_{\alpha,\beta}^i$ exceeds a certain percentile (e.g. 80%) of the $A_\alpha$ and $A_\beta$ speed variance histogram, then this Suspect Activity Module (SAM) is switched to an activated state.

$SAM_4$: Excessive Shoulder(s) Orientation Changes and Head-Swinging Actions

This module addresses both moving and stationary Tracked Persons, by detecting and assessing Tracked Persons exhibiting unusually large numbers of:

(i) changes in shoulder orientation; and/or (ii) head swinging from side to side.

In particular, the action labels Action$_i$(t) from the Human Pose Estimation Module (HPEM) 120 are assessed to calculate the numbers ($\Delta Pose_{sh,h}^i$) of changes in shoulder orientation and/or side to side head swinging activities performed by Tracked Person$_i$ over a predefined time interval (e.g. one minute). Similarly, by combining the action labels Action$_i$(t) and predicted trajectory data $\hat{H}_i$ received from the Trajectory Computation Module (TCM) 122, it is possible to count the number of changes in shoulder orientation and/or side to side head swinging activities performed by other Tracked Persons in the same region of the store as Tracked Person$_i$. From this it is possible to establish a histogram of the numbers of changes in shoulder orientation and/or side to side head swinging activities performed within the population of Tracked Persons in the relevant region of the store. For brevity, this histogram will be referred to henceforth as the shoulder head change histogram. To ensure its efficacy, the shoulder head change histogram is updated with each Tracked Person entering the relevant region of the store.

The computed variable $\Delta Pose_{sh,h}^i$ is then compared with the shoulder head change histogram. If $\Delta Pose_{sh,h}^i$ exceeds a certain percentile (e.g. 80%) of the shoulder head change histogram, it suggests that Tracked Person$_i$ is exhibiting suspect behaviour consistent with store surveying, rather than interest in a particular product. In other words, if $\Delta Pose_{sh,h}^i$ exceeds a certain percentile (e.g. 80%) of the shoulder head change histogram, then this Suspect Activity Module (SAM) is switched to an activated state.

It will be appreciated that the present application is not limited to a histogram method of detecting unusually high number of changes in shoulder orientation and/or head swinging. Instead, it could be detected by another statistical technique including by comparison to the mean and variance/standard deviation of the numbers of changes in shoulder orientation and/or side to side head swinging activities performed within the population of Tracked Persons in the relevant region of the store.

SAM$_5$: Repeated Squatting and/or Bending Actions Performed from Standing

It will be appreciated that some activities that are identifiable as potential shoplifting behaviours may be entirely innocent. A squatting or bending action from a standing posture may be associated with an innocent activity of tying a shoe lace, or picking up a dropped item. However, it may also be associated with the less innocent activity of stashing or hiding goods removed from store shelves/racks for later collection and removal from the store (without paying for the goods) by the thief or an accomplice.

Thus, the aim of this Suspect Activity Module (SAM) is to detect and assess standing Tracked Persons who squat and/or bend down multiple times in an area of the store. The action labels Action$_i$(t) from the Human Pose Estimation Module (HPEM) 120 are assessed to calculate two parameters are considered in this test, namely:

(i) the number ($N_{sq,bnd}^i$) of squatting and/or bending actions performed by Tracked Person$_i$ during a pre-defined observation time (e.g. 3 s); and
 (ii) the speed ($V_{sq,bnd}^i$) with which repeated squatting and/bending actions are performed by Tracked Person$_i$ during a predefined observation time.

For clarity, $V_{sq,bnd}^i$ is measured as the time interval between two consecutive squats and/or bending activities).

Similarly, by combining the action labels Action$_i$(t) received from the Human Pose Estimation Module (HPEM) 120 and predicted trajectory data H$_i$ received from the Trajectory Computation Module (TCM) 122, it is possible to count the number of squatting and/or bending actions performed by other shoppers in the same region of the store as Tracked Person$_i$ over a pre-defined observation period (e.g. one-week). From this it is possible to establish the mean ($\mu_{sq,bnd}$) and standard deviation ($\sigma_{sq,bnd}$) of the number of squatting and/or bending actions performed by Tracked Persons in this region of the store; and a histogram of the same observable variable. For brevity, this histogram will be referred to henceforth as the squat-bend histogram. To ensure its currency, the squat-bend histogram is updated periodically in accordance with store management requirements. From $\mu_{sq,bnd}$ and $\sigma_{sq,bnd}$ it is possible to establish a maximum threshold ($Th_{N_{sq,bnd}}$) for the number of squatting and/or bending actions performed by a Tracked Person in that region of the store. Alternatively, the maximum threshold ($Th_{N_{sq,bnd}}$) could be established with reference to a certain percentile of the squat-bend histogram.

Using the same the action labels Action$_i$(t) and predicted trajectory data H$_i$ it is possible to calculate the speed ($V_{sq,bnd}^i$) with which repeated squatting and/bending actions are performed by Tracked Persons in the same region of the store as Tracked Person$_i$ over a pre-defined observation period (e.g. one-week).

From this it is possible to establish the mean ($\mu V_{sq,bnd}$) and standard deviation ($\sigma V_{sq,bnd}$) of the speed with which repeated squatting and/bending actions are performed by Tracked Persons in this region of the store; and a histogram of the same observable variable.

For brevity, this histogram will be referred to henceforth as the squat-bend speed histogram. To ensure its efficacy, the squat-bend speed histogram may be updated periodically in accordance with store management requirements.

From $\mu V_{sq,bnd}$ and $\mu V_{sq,bnd}$ it is possible to establish a maximum threshold ($Th_{V_{sq,bnd}}$) for the number of squatting and/or bending actions performed by a Tracked Person in that region of the store. Alternatively, the maximum threshold ($Th_{V_{sq,bnd}}$) may be established with reference to a certain percentile of the squat-bend histogram.

If $N_{sq,bnd}^i > Th_{N_{sq,bnd}}$ and $V_{sq,bnd}^i > Th_{V_{sq,bnd}}$ then this Suspect Activity Module (SAM) is switched to an activated state.

SAM$_6$: Patrolling Between Shelves Behaviour Plus Bending and or Squatting

Repeated Tracked Person looping trajectories around or between adjacent and/or facing shelves combined with repeated bending and squatting activities proximal to the shelves is highly indicative of shop-lifting behaviour. Thus, this test can combine modified forms of the tests from SA3 and SA5. In a first step, using knowledge of the layout of the store a first location $A_\alpha$ and a second location $A_\beta$ in the store are pre-defined. The first location $A_\alpha$ is selected to be proximal to a first shelving unit (or rack, or cabinet etc.); and the second location $A_\beta$ is selected to be proximal to a second shelving unit (or rack, or cabinet etc.) which may be adjoined or disposed to be spaced from and facing the first shelving unit.

Using the predicted trajectory data $\hat{H}_i$ received from the Trajectory Computation Module (TCM) 122 a calculation is made of the number of times ($Loop_{\alpha,\beta}^i$) Tracked Person$_i$ performs a loop between $A_\alpha$ and $A_\beta$. Similarly, combining the predicted trajectory data $H_i$ with the action labels Action$_i$(t) from the Human Pose Estimation Module (HPEM) 120 a calculation is made of the number ($N_{sq,bnd}^i$) of squatting and/or bending actions performed by Tracked Person$_i$ during a predefined observation time (e.g. 3 s) in the region between $A_\alpha$ and $A_\beta$. It will be appreciated therefore that if ($Loop_{\alpha,\beta}^i > 2$) and ($N_{sq,bnd}^i > 2$) then this Suspect Activity Module (SAM) is switched to an activated state SAM$_7$: Repeated Rapid Movements with Different Products Having Security Tag Attached This module considers the speed of movement of a Tracked Person's hand that is in contact with or proximal to several products, wherein each of the products has a security tag attached thereto. For brevity, these items will be referred to henceforth as tagged objects.

More specifically, this test considers two parameters, namely:

(i) the time elapsed between pick-up and dropping of a specific tagged object; and
 (ii) the number of tagged items moved unusually quickly by a Tracked Person within a pre-defined period.

In the first step of this test, the ID (ID(Obj$_i$)) of detected objects from the Object Detection Module (ODM) 124 are assessed to identify objects in a scene that have security tags attached thereto. The location (Loc(Obj$_i$)) and ID (ID(Obj$_i$)) of detected tagged objects from the Object Detection Module (ODM) 124 are used to calculate the time elapsed between when a Tracked Person picks up a tagged object $Obj_i$ ($t_{pick}$) until the Tracked Person drops the tagged object ($t_{drop}$).

The elapsed time ($t_{drop} - t_{pick}$) will be referred to as the Interaction Time ($t_{inter}^{Obji}$) with the tagged object $Obj_i$. By performing this analysis for every Tracked Person who picks up the same tagged object $Obj_i$ during a pre-defined observation period (e.g. one week) it is possible to establish the mean ($\mu_{t_{inter}}^{Obji}$) and standard deviation ($\sigma_{t_{inter}}^{Obji}$) of the Interaction Time with that tagged object $Obj_i$. Using a similar approach, it is also possible to calculate the Interaction Time of a Tracked Person$_i$ with the tagged object $Obj_i$. If Tracked Person$_i$'s Interaction Time with the tagged object $Obj_i$ exceeds the observed mean interaction time $\mu_{t_{inter}}^{Obji}$ with the tagged object $Obj_i$ by more than 20%, then the second step of the test is triggered.

In the second step of the test, the location (Loc($Obj_i$)) and ID (ID($Obj_i$)) of detected tagged objects from the Object Detection Module (ODM) 124 are used to calculate over a pre-defined observation period (e.g. 1 minute), the number of tagged objects for each of which the Tracked Person$_i$'s Interaction Time exceeds the observed mean interaction time $\mu_{t_{inter}}^{Obji}$ with the tagged object $Obj_i$ by more than 20%. For brevity, this variable will be referred to henceforth as Rapidly Moved Object Number. In the event the Tracked Person$_i$'s Rapidly Moved Object Number exceeds a pre-defined threshold (e.g. 3), meaning that the Tracked Person$_i$ has interacted unusually quickly with an unusual number of tagged objects during the observation period, then this Suspect Activity Module (SAM) is switched to an activated state.

SAM$_8$: Detection of Un-Inspected Object Displacement

A possible behaviour associated with shop lifting includes the displacement of multiple objects within a short time period of time without inspecting the product. This for example may include interacting with greater than three items, excluding groceries, in under one minute.

To determine this, the action labels Action$_i$(t) from the Human Pose Estimation Module (HPEM) 120 are combined with the location (Loc($Obj_i$)) and ID (ID($Obj_i$)) of detected objects from the Object Detection Module (ODM) 124. This combination is used to detect instances of movement by a Tracked Person$_i$ of an object $Obj_i$ from a first location ($l_1$) to a second location ($l_2$) without interruption by the Tracked Person$_i$ to inspect the object $Obj_i$.

Such instances are referred to herein as Un-Inspected Object Displacements. Since groceries are often moved on a shelf by everyday shoppers, grocery-related items will not be considered as objects for the purpose of this test.

This Suspect Activity Module (SAM) calculates the number of Un-Inspected Object Displacements performed by the Tracked Person$_i$ within a pre-defined sliding sample window (e.g. of 1 minute) implemented within a pre-defined observation period. If the number of Un-Inspected Object Displacements exceeds a pre-defined threshold, then this Suspect Activity Module (SAM) is switched to an activated state.

SAM$_9$: Detection of Repeated Simultaneous Multiple Product Displacements.

Displacement by a Tracked Person of more than two products at once is suggestive of shop-lifting behaviour. Thus, this test focusses on detecting Tracked Persons who displace multiple products at the same time (e.g. moving products from one shelf to another).

The action labels Action$_i$(t) from the Human Pose Estimation Module (HPEM) 120 are combined with the location (Loc($Obj_i$)) and ID (ID($Obj_i$)) of detected objects from the Object Detection Module (ODM) 124 to detect instances of movement by a Tracked Person$_i$ of several objects $Obj_i$ from a first location ($l_1$) to a second location ($l_2$). Such instances are referred to herein as Simultaneous Multiple Object Displacements. The system counts the number of Simultaneous Multiple Object Displacements performed by the Tracked Person$_i$ within a pre-defined observation period (e.g. 30 s). In the event the calculated number of Simultaneous Multiple Object Displacements performed by the Tracked Person$_i$ exceeds a pre-defined threshold, then this Suspect Activity Module (SAM) is switched to an activated state.

SAM$_{10}$: Detection of Tracked Persons Holding a Product While Looking Elsewhere A further behaviour associated with shop lifting includes a person who, while holding an object in their hand swings their head from side to side or otherwise performs a number of shoulder movements. This number of shoulder movements is above a threshold that would be considered as normal.

The action labels Action$_i$(t) from the Human Pose Estimation Module (HPEM) 120 are combined with the location (Loc($Obj_i$)) and ID (ID($Obj_i$)) of detected objects from the Object Detection Module (ODM) 124 to detect a Tracked Person$_i$ holding a product (i.e. Tracked Person$_i^{Prod}$). The action labels Action$_i$(t) from the Human Pose Estimation Module (HPEM) 120 are then further assessed to calculate the numbers ($\Delta Pose_{sh,h}^i$) of changes in shoulder orientation and/or side to side head swinging activities performed by Tracked Person$_i^{Prod}$ referred to herein as Product Holding Client Upper Torso Movements. If the number of Product Holding Client Upper Torso Movements performed by Tracked Person$_i^{Prod}$ over a predefined time interval (e.g. one minute) exceeds a pre-defined threshold, then this Suspect Activity Module (SAM) is switched to an activated state.

SAM$_{11}$: Detection of Products Being Thrown from One Shelf to Another or Over Security Barriers.

The action labels Action$_i$(t) from the Human Pose Estimation Module (HPEM) 120 and the location (Loc($Obj_i$)) and ID (ID($Obj_i$)) of detected objects from the Object Detection Module (ODM) 124 are used by this Suspect Activity Module (SAM) to detect (i) a Tracked Person (i.e. Tracked Person$_i^{Prod}$) holding a product $Obj_i$ in their hands and subsequently having empty hands;

(ii) the location Loc($Obj_i$) of the product $Obj_i$ prior to it being picked up by the Tracked Person$_i^{Prod}$ (iii) the instant at which a transition $\gamma_{Tracked\,Person_i^{Prod}}^{Trans}$ occurs between the Tracked Person$_i^{Prod}$ holding the product $Obj_i$ in their hands and attaining empty hands.

Using the predicted trajectory data $\hat{H}_i$ received from the Trajectory Computation Module (TCM) 122 the trajectory of the Tracked Person$_i^{Prod}$ as they move through the store is determined and correlated with a layout map of the store. If at the $\gamma_{Tracked\,Person_i^{Prod}}^{Trans}$ instant, the Tracked Person$_i^{Prod}$ was located proximal to a shelf other than that from which the Tracked Person$_i^{Prod}$ picked up the product $Obj_i$; or an exit security barrier from the store, then this Suspect Activity Module (SAM) is switched to an activated state.

SAM$_{12}$: Detection of Tracked Persons Lifting Products Over their Head at Store Exit Security Barriers.

The action labels Action$_i$(t) from the Human Pose Estimation Module (HPEM) 120 and the location (Loc($Obj_i$)) and ID (ID($Obj_i$)) of detected objects from the Object Detection Module (ODM) 124 to detect a Tracked Person (i.e. Tracked Person$_i^{Over}$) holding a product $Obj_i$ in their hands, with their hands raised over their heads. Using the predicted trajectory data $\hat{H}_i$ received from the Trajectory Computation Module (TCM) 122 the trajectory of the Tracked Person$_i^{Over}$ as they move through the store is determined and correlated with a layout map of the store. If the Tracked Person$_i^{Over}$ is located proximal to an exit security barrier from the store, then this Suspect Activity Module (SAM) is switched to an activated state.

SAM$_{13}$: Detection of Tracked Person Patrolling Between a First Shelf and Second Shelf After Examining a Product stored on the First Shelf A further typical behaviour is the removal of security tags from one or more products. The products are then concealed, for example in voluminous clothing. This module attempts to identify such behaviours.

The action labels Action$_i$(t) from the Human Pose Estimation Module (HPEM) 120 and the location (Loc(Obj$_i$)) and ID (ID(Obj$_i$)) of detected objects from the Object Detection Module (ODM) 124 are combined to detect:
  (i) a Tracked Person (i.e. Tracked Person$_i^{Prod}$) holding a product Obj$_i$ in their hands and subsequently having empty hands;
  (ii) the location Loc(Obj$_i$) of the product Obj$_i$ prior to it being picked up by the Tracked Person$_i^{Prod}$
  (iii) the instant at which a transition $\gamma_{Tracked\_Person_i^{Prod}}^{Trans}$ occurs between the Tracked Person$_i^{Prod}$ holding the product Obj$_i$ in their hands and attaining empty hands; and the location LOC($\gamma_{Tracked\_Person_i^{Prod}}^{Trans}$) of that transition.

Using the predicted trajectory data $\hat{H}_i$ received from the Trajectory Computation Module (TCM) 122 a calculation is made of the number of times (Loop$_{\alpha,\beta}^i$) Tracked Person$_i$ performs a loop between Loc(Obj$_i$) and Loc($\gamma_{Tracked\_Person_i^{Prod}}^{Trans}$). If Loop$_{\alpha,\beta}^i$ exceeds a pre-defined threshold, then this Suspect Activity Module (SAM) is switched to an activated state.

SAM$_{14}$: Detecting Repetitive Tracked Person Movement with a Product Using the Same Body Part This activity is suggestive of an intent to remove a security tag from a product using a hidden magnet. As will be recalled, the Object Detection Module (ODM) 124 output comprises the location and objects IDs for all the objects that appear in a video frame in the hand of a Tracked Person$_i$. Thus, in the first step of this test, the ID (ID(Obj$_i$)) of detected objects from the Object Detection Module (ODM) 124 are assessed to identify objects in a scene that have security tags attached thereto and the locations of those objects.

The action labels Action$_i$(t) from the Human Pose Estimation Module (HPEM) 120 are assessed to calculate the numbers of times a Tracked Person$_i$'s hand(s) move from a first location proximal to the location of the or each security tagged object, to a second location closer to the Tracked Person$_i$'s trunk. For brevity, these hand(s) movements will be referred to henceforth as Object-Trunk Loops. If the number of Object-Trunk Loops exceeds a pre-defined threshold with a pre-defined time interval (e.g. >3 Object-Trunk Loops in a minute), then this Suspect Activity Module (SAM) is switched to an activated state.

As described above the activation of the Suspect Activity Modules (SAM$_5$) and the corresponding weighting provides a behaviour or penalty point score.

As further indicated in FIG. 1, an accumulation unit or a Score Update Unit 110 is provided. The Score Update Unit 110 is adapted to receive a Tracked Person$_i$'s Suspect Behaviour Score (SBS$_i$) from the Client Tracking Unit (CTU) 104 and the Tracked Person$_i$'s Penalty Points (PP$_i$) from the Suspect Activity Detection Unit (SADU) 108. The Score Update Unit 110 is adapted to add the Tracked Person$_i$'s Penalty Points (PP$_i$) to the Tracked Person$_i$'s Suspect Behaviour Score (SBS$_i$) so that the Tracked Person$_i$'s Suspect Behaviour Score (SBS$_i$) effectively provides a running tally of the Tracked Person$_i$'s suspect activities/behaviour during their stay in the store.

Figure 6:
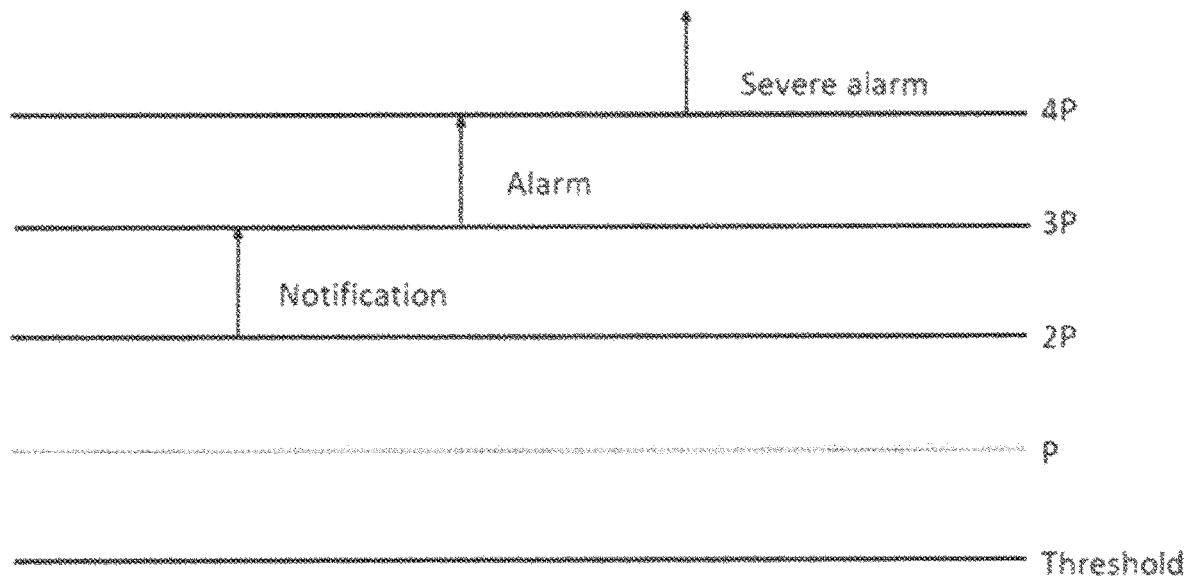
FIG. 6 provides an overview of an exemplary embodiment of alert threshold levels in accordance with one embodiment of the present invention.

When this updated score exceeds a target, a message or alert is triggered. This message is issued by a Message Issuing Unit (MIU) 112. The Message Issuing Unit (MIU) 112 is adapted to issue notifications or alarms when the updated score meets or exceeds a threshold. Severity levels may be set for the alarms. The threshold may be pre-configured and/or adapted to requirements. For example, the Message Issuing Unit (MIU) 112 may be adapted to issue one of three message types, namely "Notification", "Alarm" and "Severe Alarm". A Notification message signals a detected suspicious behaviour; an "Alarm" message signals the detection of a shoplifting behaviour; and a "Severe Alarm" message signals a presumptive shoplifting event detection. The message type triggered is dependent on the number of Penalty Points by which a Tracked Person$_i$'s Suspect Behaviour Score (SBS$_i$) exceeds the above-mentioned threshold. An example configuration is outlined in FIG. 6. Defining T$_h$ as the threshold; and P as a pre-configurable message trigger, then referring to FIG. 6:
  (i) if $2P \leq SBS_i - T_h < 3P$ the issued message is a "Notification"
  (ii) if $3P \leq SBS_i - T_h < 4P$ the issued message is a "Alarm"
  (iii) if $BS_i - T_h \geq 4P$ the issued message is a "Severe Alarm"

The Notification, the Alarm or the Severe Alarm message will be issued to a security officer who will take the necessary response action in accordance with the store's policy. In use, the threshold and the pre-configurable message trigger(s) can be manually calibrated for each store (based on store layout and local social environment), to meet required management standards for staff-client interaction.

Figure 7:
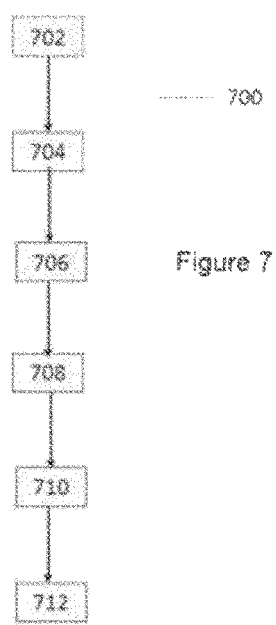
FIG. 7 is an implementation of the method of the present invention.

In an overview of the method of the present invention and as outlined in relation to FIG. 7, there is provided a method (700) for the identification of suspect behaviour in a retail environment, comprising: receiving (702) a stream of video data from a plurality of video sensors; detecting (704) a person in a frame of said stream of video data; extracting (706) a set of activities of the identified person from the stream of video data; assigning (708) a numeric value to each extracted activity in the set of extracted activities, said numeric value representative of a threat level of the activity; accumulating (710) said numeric values to provide a behaviour score; and identifying (712) a behaviour as being suspect when the behaviour score reaches a target threshold value associated with the behaviour.

Figure 8:
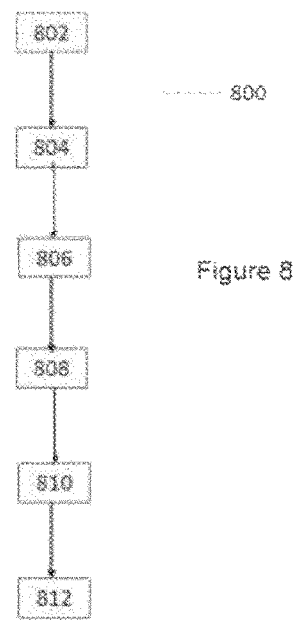
FIG. 8 is an embodiment of the apparatus of the present invention.

The method as described in relation to FIG. 7 implements the system as described in relation to FIGS. 1 to 6. The system described in relation to FIG. 8 is arranged to implement this method. The system comprises means (802) for receiving a stream of video data from a plurality of video sensors; means (804) for detecting a Tracked Person in a first frame of said stream of video data; means (806) for extracting a set of behaviours of the detected Tracked Person from the stream of video data; means (808) for assigning a numeric value to each extracted behaviour in the set of extracted behaviours, said numeric value representative of a threat level of the behaviour; means (810) for accumulating said numeric values to provide a behaviour score; and means (812) for identifying a particular Tracked Person behaviour when the accumulated behaviour score reaches a target value associated with the particular behaviour.

The above-described embodiments of the present technology can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be genetically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above. In this respect, it should be appreciated that one implementation of the embodiments of the present technology comprises at least one computer-readable storage medium (e.g., a computer memory, a floppy disk, a compact disk, a tape, a flash drive, etc.) encoded with a computer program (i.e., a plurality of instructions), which, when executed on a processor, performs the above-discussed functions of the embodiments of the present technology. The computer-readable storage medium can be transportable such that the program stored thereon can be loaded onto any computer resource to implement the aspects of the present technology discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the technology.

While various inventive embodiments have been described and illustrated herein, those of ordinary skill in the art will readily envision a variety of other means and/or structure for performing the function and/or obtaining the results and/or one or more of the advantages described herein, and each of such variations and/or modifications is deemed to be within the scope of the inventive embodiments described herein. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present technology are directed to each individual feature, system, article, material, kit, and/or method described herein. In addition, any combination of two or more such features, systems, articles, materials, kits, and/or methods, if such features, systems, articles, materials, kits, and/or methods are not mutually inconsistence, is included within the inventive scope of the present disclosure. All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one."

The words "comprises/comprising" and the words "having/including" when used herein with reference to the present invention are used to specify the presence of stated features, integers, steps or components but do not preclude the presence or addition of one or more other features, integers, steps, components or groups thereof. It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A method for identification of suspect behaviour in a retail environment, comprising:
   detecting a person in a frame of a stream of video data obtained from a plurality of video sensors in the retail environment, wherein detecting the person comprises establishing localization information for the detected person, by establishing a bounding box framing the person;
   classifying the identified person as a tracked person or a non-tracked person;
   tracking the path of the tracked person about the retail environment, wherein tracking the path of the tracked person comprises encoding the appearance of the person based on a plurality of semantic features selected from a list including visual appearance, body movement or interaction with the surroundings in the retail environment;
   extracting by a behaviour detection unit, a set of activities of the tracked person from the one or more frames of the stream of video data, wherein extracting the set of activities comprises estimating a set of poses of tracked person, and wherein estimating the set of poses comprises identifying a predefined set of points on the tracked person and detecting successive movements of each of the predefined set of points over a time interval, and wherein the behaviour detection unit comprises a trajectory computation module adapted to output a predicted trajectory for the tracked person; an object detection module configured to detect an object which the tracked person picked up in the retail environment and assign a unique object identifier to the object; and a human pose estimation module for the detection of the set of activities or behaviours of the identified tracked person;
   assigning a numeric value to each extracted activity in the set of extracted activities, said numeric value being representative of a threat level of the activity;
   accumulating said numeric values to provide a behaviour score; and
   identifying a behaviour as being suspect when the behaviour score reaches a target threshold value associated with the behaviour.

2. The method according to claim 1 further comprising assigning a unique identifier to the detected person.

3. The method according to claim 1, wherein extracting the set of activities further comprises determining a vector representative of a trajectory of the identified person about the retail environment.

4. The method according to claim 1 wherein assigning the numeric value comprises assigning a value of 1 to each extracted activity and weighting the value based on a likelihood that the activity is associated with a behaviour to provide the numeric value.

5. The method according to claim 1 further comprising generating an alert when the accumulated behaviour score reaches the target threshold associated with the behaviour.

6. The method of claim 5 comprising setting a plurality of target threshold values, each target threshold value associated with a different alert from a set of predefined alerts.

7. The method according to claim 1 further comprising obtaining the stream of video data by a plurality of video sensors positioned to monitor selected zones of the retail environment.

8. A non-transitory computer readable storage medium carrying a computer program stored thereon which when executed by a processing module implements the method according to claim 1.

9. An apparatus for identification of suspect client behaviour in a retail environment, comprising:
- means for detecting a person in a frame of a stream of video data obtained from a plurality of video sensors in the retail environment, wherein detecting the person comprises establishing localization information for the detected person, by establishing a bounding box framing the person;
- means for classifying the identified person as a tracked person or a non-tracked person;
- means for tracking the path of the tracked person about the retail environment, wherein tracking the path of the tracked person comprises encoding the appearance of the person based on a plurality of semantic features selected from a list including visual appearance, body movement or interaction with the surroundings in the retail environment;
- means for extracting by a behaviour detection unit, a set of activities of the tracked person from the one or more frames of the stream of video data, wherein extracting the set of activities comprises estimating a set of poses of tracked person, and wherein estimating the set of poses comprises identifying a predefined set of points on the tracked person and detecting successive movements of each of the predefined set of points over a time interval, and wherein the behaviour detection unit comprises a trajectory computation module adapted to output a predicted trajectory for the tracked person; an object detection module configured to detect an object which the tracked person picked up in the retail environment and assign a unique object identifier to the object; and a human pose estimation module for the detection of the set of activities or behaviours of the identified tracked person;
- means for assigning a numeric value to each extracted activity in the set of extracted activities, said numeric value being representative of a threat level of the activity;
- means for accumulating said numeric values to provide a behaviour score; and
- means for identifying a behaviour as being suspect when the behaviour score reaches a target threshold value associated with the behaviour.

10. The apparatus of claim 9 wherein the means for detecting a person comprises a client tracking unit, means for extracting comprises a behaviour feature detection unit, means for assigning comprises a suspect activity detection unit; means for accumulating comprises a score update unit and means for identifying comprises a message issuing unit.

* * * * *